(12) United States Patent
Ward

(10) Patent No.: US 9,619,744 B2
(45) Date of Patent: Apr. 11, 2017

(54) COLORED SMART CARD MODULE

(71) Applicant: JOHNSON ELECTRIC S.A., Murten (CH)

(72) Inventor: Dominic John Ward, Carisbrooke (GB)

(73) Assignee: JOHNSON ELECTRIC S.A., Murten (CH)

( * ) Notice: Subject to any disclaimer, the term of this patent is extended or adjusted under 35 U.S.C. 154(b) by 0 days.

(21) Appl. No.: 15/179,632

(22) Filed: Jun. 10, 2016

(65) Prior Publication Data

US 2016/0364638 A1    Dec. 15, 2016

(30) Foreign Application Priority Data

Jun. 12, 2015    (GB) .................................. 1510252.8

(51) Int. Cl.
*G06K 19/077*    (2006.01)
*G06K 19/04*    (2006.01)
*G06K 19/02*    (2006.01)

(52) U.S. Cl.
CPC ....... *G06K 19/07747* (2013.01); *G06K 19/02* (2013.01); *G06K 19/044* (2013.01); *G06K 19/0772* (2013.01)

(58) Field of Classification Search
CPC ....... G06K 19/07745; G06K 19/07747; G06K 19/044; G06K 19/0772

USPC .......................................................... 235/492
See application file for complete search history.

(56) References Cited

U.S. PATENT DOCUMENTS

| | | | |
|---|---|---|---|
| 6,259,035 B1 * | 7/2001 | Truggelmann | C23C 2/04 174/250 |
| 9,355,348 B2 * | 5/2016 | Guijarro | G06K 19/077 |
| 2008/0205012 A1 * | 8/2008 | Heinemann | G06K 19/07743 361/767 |

FOREIGN PATENT DOCUMENTS

| | | |
|---|---|---|
| JP | 2014-085997 | 5/2014 |
| KR | 1020110088253 A | 8/2011 |
| WO | WO-2009/012251 A1 | 1/2009 |
| WO | WO-2014/037450 A2 | 3/2014 |

* cited by examiner

*Primary Examiner* — Suezu Ellis
(74) *Attorney, Agent, or Firm* — Muncy, Geissler, Olds & Lowe, P.C.

(57) ABSTRACT

A colored smart card module having a light-transmissible substrate with first and second sides; a card-reader contact element formed on the first side of the substrate; and a colored ink layer printed on the second side of the substrate. The printed colored ink layer is then at least in part visible from the first side of the substrate around the card-reader contact element. A smart card including such a colored smart card module is also provided.

18 Claims, 2 Drawing Sheets

COLORED SMART CARD MODULE

CROSS REFERENCE TO RELATED APPLICATIONS

This non-provisional patent application claims priority under 35 U.S.C. §119(a) from Patent Application No. 1510252.8 filed in United Kingdom on Jun. 12, 2015, the entire contents of which are hereby incorporated by reference.

FIELD OF THE INVENTION

This invention relates to a colored smart card module for a smart card, and to a smart card utilizing such a colored smart card module.

BACKGROUND OF THE INVENTION

Smart cards are widely used for a variety of applications, and in particular are used as bank cards, such as credit or debit cards, to authorize financial transactions for a user. Such cards are often colored over the entire smart card body aside from contacts, either for aesthetic appeal, to reflect branding of the card-issuing company, or a combination thereof.

To provide a physical card-reader contact for the smart card, a separate module is constructed and then inserted into the smart card body during assembly. Such smart card modules typically comprise a robust electrically conductive interface which can make physical contact with contacts within a card-reader, and an integrated circuit chip internal to the smart card which is electrically coupled to the conductive interface.

There are various methods of attaching an integrated circuit chip to the conductive interface, but all involve providing a substrate onto which the conductive interface can be mounted so as to face outwardly on the smart card, thereby providing sufficient structural support to be able to attach electrical connectors to the integrated circuit chip.

The substrate is generally chosen from one of two materials: epoxy glass, which is an FR4 material and is usually colored so as to be yellow, grey or black; or polyethylene terephthalate (PET) which is either transparent, or dyed black or white. Regardless of how the colored smart card module is installed into the smart card, at least a portion of the substrate will be visible to a user, and the coloration of the substrate can diminish the aesthetic appeal of the overall smart card.

To obtain a colored PET, the transparent material is dyed with either black or white dye. This dye impacts the adhesion of electrically conductive material to the surface of the substrate, making it difficult to provide an integrated circuit connection element on the substrate, substantially increasing the risk of connection failure. The application of this dye is also relatively expensive, increasing the cost-per-unit to manufacture a smart card module by a significant percentage. Different dye colors can be utilized, but, due to the small numbers typically required, are not due to the extensive testing required to make sure robustness is maintained over the life of the module.

SUMMARY OF THE INVENTION

Hence there is a desire for a colored smart card module which does not affect the adhesion of electrically conductive components to the substrate of the module, thereby enabling a wider variety of colors to be considered and utilized without extensive testing and thus excessive cost.

According to a first aspect of the invention there is provided a colored smart card module comprising: a light-transmissible substrate having opposite first and second sides; a card-reader contact element formed on the first side of the substrate; and a colored ink layer printed on the second side of the substrate, the printed colored ink layer being at least in part visible from the first side of the substrate at or adjacent to the card-reader contact element.

By providing a smart card module which has a light-transmissible substrate, such that a user can see through the substrate to a colored ink layer on a reverse side thereof, it becomes possible to design the viewable portion of the smart card module not obscured by the card-reader contact element so as to match or substantially match the color of the surrounding smart card body into which the colored smart card module is to be installed. Beneficially, this allows for the creation of a fully colored smart card in which the coloration and/or graphical design extends into the area in which the smart card module is installed, creating a unified and continuous aesthetic appearance.

Preferably the colored smart card module may further comprise an integrated circuit connection element on the second side of the substrate, the colored ink layer being positioned at or adjacent to the integrated circuit connection element.

By only printing the colored ink layer around an integrated circuit connection element on the second side of the substrate, the amount of ink required in order to create a unified aesthetic appearance is minimized, reducing the overall material cost required in the production of such smart card modules.

In an optional embodiment, the colored ink layer may be positioned on the second side only where there is optical access to the second side from the first side.

In a similar vein to the positioning of the colored ink layer at or adjacent to the integrated circuit connection element, by only positioning the colored ink layer at a position corresponding to the location of voids on the first side of the substrate, it is possible to ensure complete coverage of the first side of the smart card such that the aesthetic appearance thereof appears continuous to a viewer of the smart card, with no anomalous colorations due to a colored substrate showing through.

The card-reader contact element may include a plurality of contact pads separated by at least one contact pad void, said optical access from the first side being provided through the at least one contact pad void.

Traditionally, the voids between the contact pads have been merely functional, providing electrical separation between adjacent contact pads. The advantage of the present invention is that these voids can now be used to enhance the visual appeal of the whole smart card.

Additionally or alternatively, the said optical access from the first side may be provided about a perimeter of the card-reader contact element.

The most obviously distracting part of many existing smart cards is the perimeter around the card-reader contact element; in order to accommodate any tolerance in the system, the aperture for the card-reader contact element in the smart card body is in fact slightly larger than the card-reader contact element, meaning that at least a portion of the perimeter of substrate will be visible. In the present invention, this portion can be disguised within the overall aesthetic appearance of the smart card.

Furthermore, the card-reader contact element may include at least one locator void, said optical access from the first side is provided through the at least one locator void.

By providing a locator void permitting optical access through the substrate within an area of the card-reader contact element, an integrated circuit chip attached to the second side of the substrate can be accurately positioned within the smart card body. Furthermore, such locator voids may be able to provide an additional and/or alternative means of providing a visual appeal of the smart card.

The substrate may preferably comprise polyethylene terephthalate, and the substrate may be a flexible substrate, transparent, and/or translucent.

The present invention is primarily aimed towards maintaining the adhesion properties for metallic conductors onto a PET substrate, which is an optimal substrate for smart card uses, whilst obviating the disadvantages associated with dyed or treated PET.

In a preferred embodiment, the colored smart card module may further comprise an integrated circuit chip.

Provision of an integrated circuit chip associated with the colored smart card module ensures that the module can be readily installed directly into a smart card, simplifying the manufacturing process of such a card.

According to a second aspect of the invention, there is provided a smart card comprising: a smart card body having an opening and a graphical design having one or more colors on a surface of the smart card body at an edge of the opening; and a colored smart card module as described above, the printed colored ink layer matching or substantially matching the or each said color at the edge of the opening of the smart card body. The colored ink layer of the colored smart card module may be on a side thereof which is installed facing into the smart card body, the colored ink layer being colored to match a color of the smart card body at or adjacent to the said opening. Preferably, the smart card module may be installed in the smart card body such that the card-reader contact element is flush or substantially flush with the smart card body By providing a smart card body and colored ink layer which match to some extent, a coherent and continuous aesthetic appearance of the entire smart card can be produced. This beneficially allows for the creation of more complex visual designs for smart cards.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
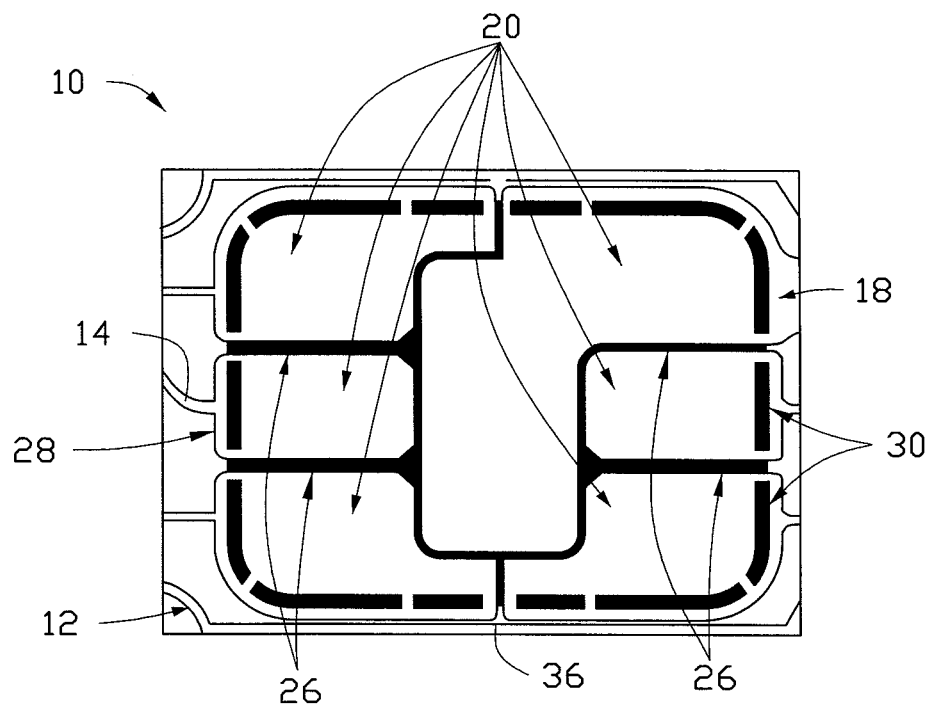
FIG. 1 shows one embodiment of a colored smart card module as viewed from a first side, in accordance with the first aspect of the invention.
Figure 2:
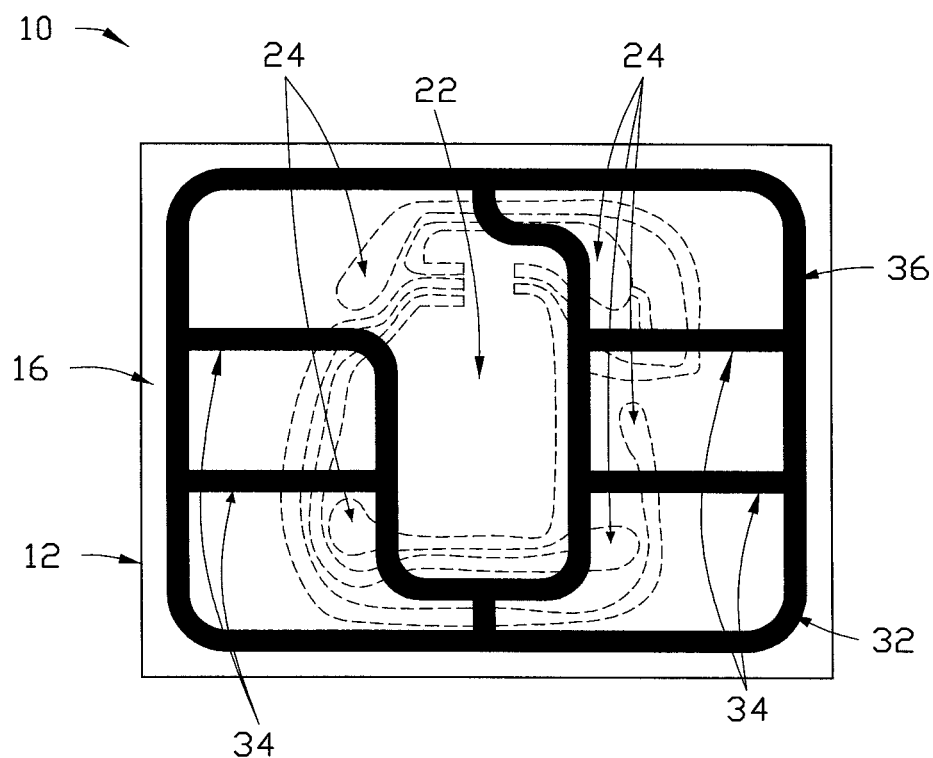
FIG. 2 shows the colored smart card module of FIG. 1, as viewed from a second side, opposite to the first side.

Referring firstly to FIGS. 1 and 2, there is illustrated a colored smart card module, indicated globally at 10, for use as part of a smart card, such as a bank card.

The colored smart card module 10 comprises a substrate 12 having a first side 14, shown in FIG. 1, and a second side 16, shown in FIG. 2, which is on the opposite side of the substrate 12 to the first side 14.

The substrate 12 used here is a light-transmissible, preferably transparent or substantially transparent, polyethylene terephthalate (PET) onto which metal plating may be readily applied to form the necessary electrically conductive layers of the module 10. PET is the industry-standard material in this respect, but any appropriately robust and light-transmissible substrate may be utilized, such as a transparent epoxy glass. The substrate 12 is therefore generally a flexible substrate, but could be provided as a rigid substrate if desired.

On the first side 14 of the substrate 12 is formed a card-reader contact element 18 having a plurality of contact pads 20 arranged in accordance with ISO standards 7810 and 7816; six such contact pads 20 are illustrated in FIG. 1, but other arrangements are also known, such as eight contact pad configurations, and these arrangements will be well known to the skilled reader.

On the second side 16 of the substrate 12 is formed an integrated circuit connection element 22 having a plurality of connection pads 24 which are arranged so as to be positionally located with corresponding contact pads 20 of the card-reader contact element 18. The corresponding contact and connection pads 20, 24 are here in electrical communication through the substrate 12, typically through via holes formed in the substrate 12, but other means of electrical interconnection are known, such as wired connection.

The contact pads 20 of the card-reader contact element 18 are formed from an electrically conductive material, most commonly a metal chosen from the selection of copper, nickel, gold, palladium, composite alloy or a multi-layered combination thereof. Other electrically conductive metals may additionally or alternatively be utilized to form the card-reader contact element 18. One common arrangement is to apply a base layer of a cupronickel alloy, such as a Monel, to the substrate 12, over which a highly-conductive layer of copper may be applied. Alternative arrangements are known, such as a protective layer of gold or palladium applied to a base conductive layer of nickel.

The connection pads 24 of the integrated circuit connection element 22 are also formed from an electrically conductive material, which may be different to the electrically conductive material of the card-reader contact element 18, though for simplicity, the same electrically conductive material is often utilized.

The contact pads 20 of the card-reader contact element 18 are spaced-apart from one another so as to avoid short-circuiting with one another, and there are therefore contact pad voids 26 between adjacent contact pads 20. There is also an exposed periphery 28 of substrate 12 which extends around a perimeter of the card-reader contact element 18.

Furthermore, and as shown in FIG. 1, there may also be at least one locator void 30 which is positioned so as to align with a perimeter 32 of the integrated circuit connection element 22 on the second side 16 of the substrate 12. Provided that the ISO regulations are complied with, any size or shape of void could feasibly be considered on the first side 14 of the substrate 12. In a similar manner, the connection pads 24 of the integrated circuit connection element 22 are spaced-apart so as to define connection pad voids 34 there between.

On the second side 16 of the substrate 12 is printed a colored ink layer 36. In the depicted embodiment, the printed colored ink layer 36 is applied to the substrate 12 around the perimeter 32 of the integrated circuit connection element 22 and in the connection pad voids 34 between adjacent connection pads 24, as shown in FIG. 2. However, the colored ink layer 36 may be applied at any corresponding position visible from the first side 14 of the substrate 12, and not necessarily around the whole or part of the perimeter 32, indicated by the dashed line in FIG. 1, in particular, at or adjacent to a corresponding position of the exposed periphery 28 of the substrate 12 around the card reader connection element 18.

By providing a colored ink over-layer 36 around and optionally over the integrated circuit connection element 22 rather than attempting to dye the substrate 12 prior to application of the metal forming the integrated circuit connection element 22, the adhesion of the said metal is not affected by the presence of the substance producing the color.

Figure 3:
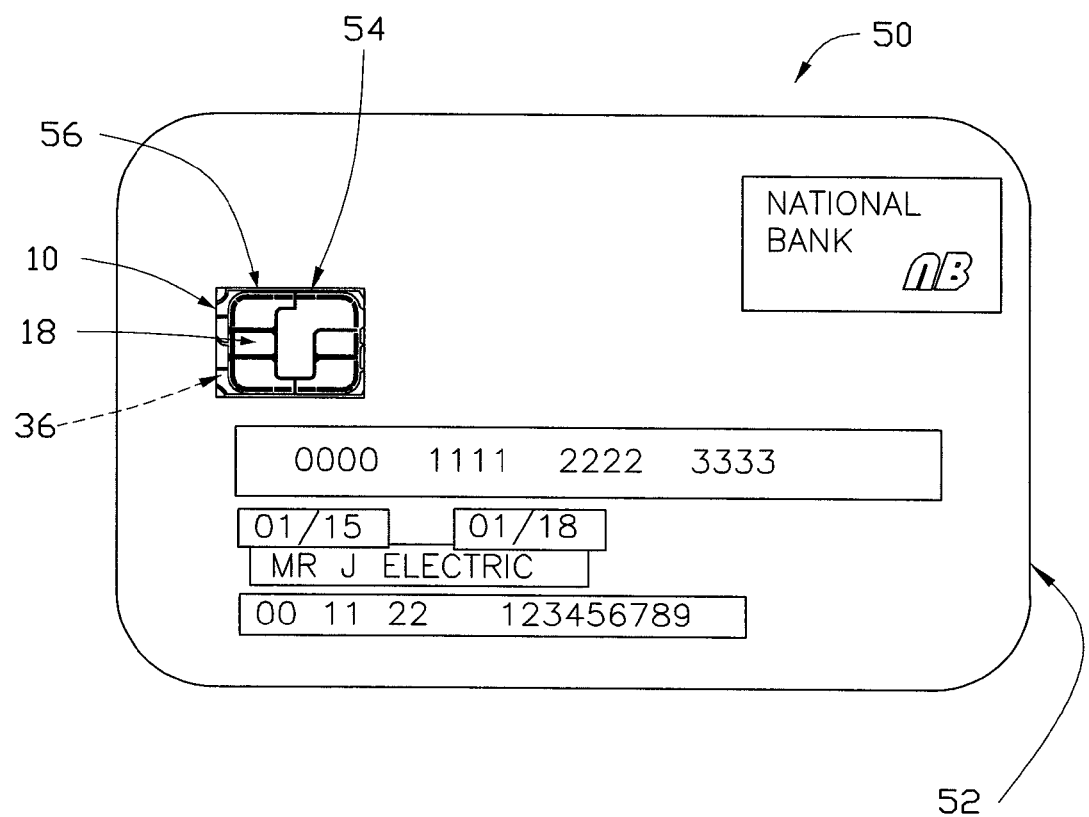
FIG. 3 shows one embodiment of a smart card in accordance with the second aspect of the invention.

In use, and as illustrated in FIG. 3, the colored smart card module 10 is installed into a smart card 50, within a colored smart card body 52 thereof. By matching the color of the printed colored ink layer 36 to a color of the colored smart card body 52, a continuous aesthetic or graphical design appearance of the smart card 50 as a whole can be produced.

To assemble the smart card 50, an integrated circuit chip is affixed to the integrated circuit connection element 22 by any one of a number of standard means, for example, by wire bonding or by using the flip chip technique. The colored smart card module 10 can then be correctly positioned within the colored smart card body 52, with the locator voids 30 potentially being utilized to correctly align the colored smart card module 10 in the colored smart card body 52. In the depicted embodiment, this means that the second side 16 is installed so as to face into the smart card body 52, such that the colored ink layer 36 is positioned internal to the smart card body 52.

As viewed from a front side of the smart card 50, as shown in FIG. 3, the colored ink layer 36 is visible from the first side 14 of the substrate 12 of the colored smart card module 10 through each of the exposed periphery 28 of the substrate 12, the contact pad voids 26 and the locator voids 30. The colored ink layer 36 is printed so as to correspond with any or all of these voids 28, 26, 30. This therefore allows the color or design of the colored smart card body 52 to be continued over the region containing the smart card module 10 to create a continuous aesthetic appearance.

The continuous aesthetic appearance of the smart card 50 can be further enhanced by matching the depth of the module accepting region or opening 54 of the smart card 50 to the height of the smart card module 10 so as to ensure that the card-reader contact element 18 sits flush with the outer surface of the colored smart card body 52. By having a graphical design having one or more colors on a surface of the smart card body 52 at or adjacent to an edge 56 of the opening 54, the continuous aesthetic appearance can be maintained, if the printed colored ink layer 36 matches or substantially matches the or each said color at the edge 56 of the said opening 54.

Although the embodiment here before described utilizes a card-reader contact element on one side of the light-transmissible substrate and an integrated circuit connection element on the opposite side of the substrate, this is an arrangement designed to be utilized with a flip chip-type arrangement. In such an arrangement, the integrated circuit chip is directly attached to the integrated circuit connection element, usually via adhesive, so as to maintain the electrical connection between the integrated circuit chip and the integrated circuit connection element.

However, alternative forms of integrated circuit chip attachment to smart card modules are known, for example, the wire bonding technique, in which the integrated circuit chip is indirectly electrically engaged with the card-reader contact element using, typically gold, wires. In such a scenario, there will be no integrated circuit connection element which is specifically affixed to the second side of the substrate. To achieve the coloration of the smart card module, it is therefore only necessary to apply or print the colored ink to the second side of the substrate without needing to apply or print the colored ink around voids in such a connection element.

Whilst the substrate has here before been described as a transparent PET material, it will be readily-apparent that the substrate need only be light-transmissible to permit a user to view the printed colored ink layer through the body of the substrate. The substrate could therefore be formed from any appropriately transparent or translucent material.

Although a printed layer is preferred, a colored ink layer deposited using a different application means may be considered, as necessity dictates. However, the term printing is intended to cover all forms of applying a colored ink layer to the substrate.

It is therefore possible to provide a colored smart card module having a light-transmissible substrate with a colored ink layer printed on one side thereof, such that the colored ink layer is visible from an opposing side of the substrate when installed into a smart card. This advantageously allows for an improved aesthetic or graphical design appearance of the smart card into which the colored smart card module is installed.

The words 'comprises/comprising' and the words 'having/including' when used herein with reference to the present invention are used to specify the presence of stated features, integers, steps or components, but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention herein described and defined.

The invention claimed is:

1. A colored smart card module comprising:
   a light-transmissible substrate having opposite first and second sides;
   a card-reader contact element formed on the first side of the substrate; a colored ink layer printed on the second side of the substrate; and
   an integrated circuit connection element formed on the second side of the substrate,
   wherein the colored ink layer is provided around and over the integrated circuit connection element, and at least in part visible from the first side of the substrate at or adjacent to the card-reader contact element.

2. The colored smart card module of claim 1, wherein the colored ink layer is positioned on the second side only where there is optical access to the second side from the first side.

3. The colored smart card module of claim 2, wherein the card-reader contact element includes a plurality of contact pads separated by at least one contact pad void, said optical access from the first side being provided through the at least one contact pad void.

4. The colored smart card module of claim 2, wherein said optical access from the first side is provided about a perimeter of the card-reader contact element.

5. The colored smart card module of claim 2, wherein the card-reader contact element includes at least one locator void, said optical access from the first side is provided through the at least one locator void.

6. The colored smart card module of claim 1, wherein the substrate comprises polyethylene terephthalate.

7. The colored smart card module of claim 1, wherein the substrate is a flexible substrate.

8. The colored smart card module of claim 1, wherein the substrate is transparent.

9. The colored smart card module of claim 1, wherein the substrate is translucent.

10. The colored smart card module of claim 1, further comprising an integrated circuit chip,
wherein the integrated circuit connection element has a plurality of connection pads, and the integrated circuit chip is directly attached to the connection pads via adhesive.

11. A smart card comprising: a smart card body having an opening and a graphical design having one or more colors on a surface of the smart card body at an edge of the opening; and the colored smart card module of claim 1, the colored ink layer matching or substantially matching the or each said color at the edge of the opening of the smart card body.

12. The smart card of claim 11, wherein the colored ink layer of the colored smart card module is on a side thereof which is installed facing into the smart card body, the colored ink layer being colored to match a color of the smart card body at or adjacent to the opening.

13. The smart card of claim 12, wherein the smart card module is installed in the smart card body such that the card-reader contact element is flush with the smart card body.

14. The smart card of claim 11, wherein the smart card module is installed in the smart card body such that the card-reader contact element is flush with the smart card body.

15. The smart card of claim 11, wherein the colored ink layer is positioned on the second side only where there is optical access to the second side from the first side.

16. The smart card of claim 15, wherein the card-reader contact element includes a plurality of contact pads separated by at least one contact pad void, said optical access from the first side being provided through the at least one contact pad void.

17. The smart card of claim 11, wherein the substrate is a flexible substrate.

18. The smart card of claim 11, wherein the substrate is transparent or translucent.

* * * * *